United States Patent Office 2,830,188
Patented Apr. 8, 1958

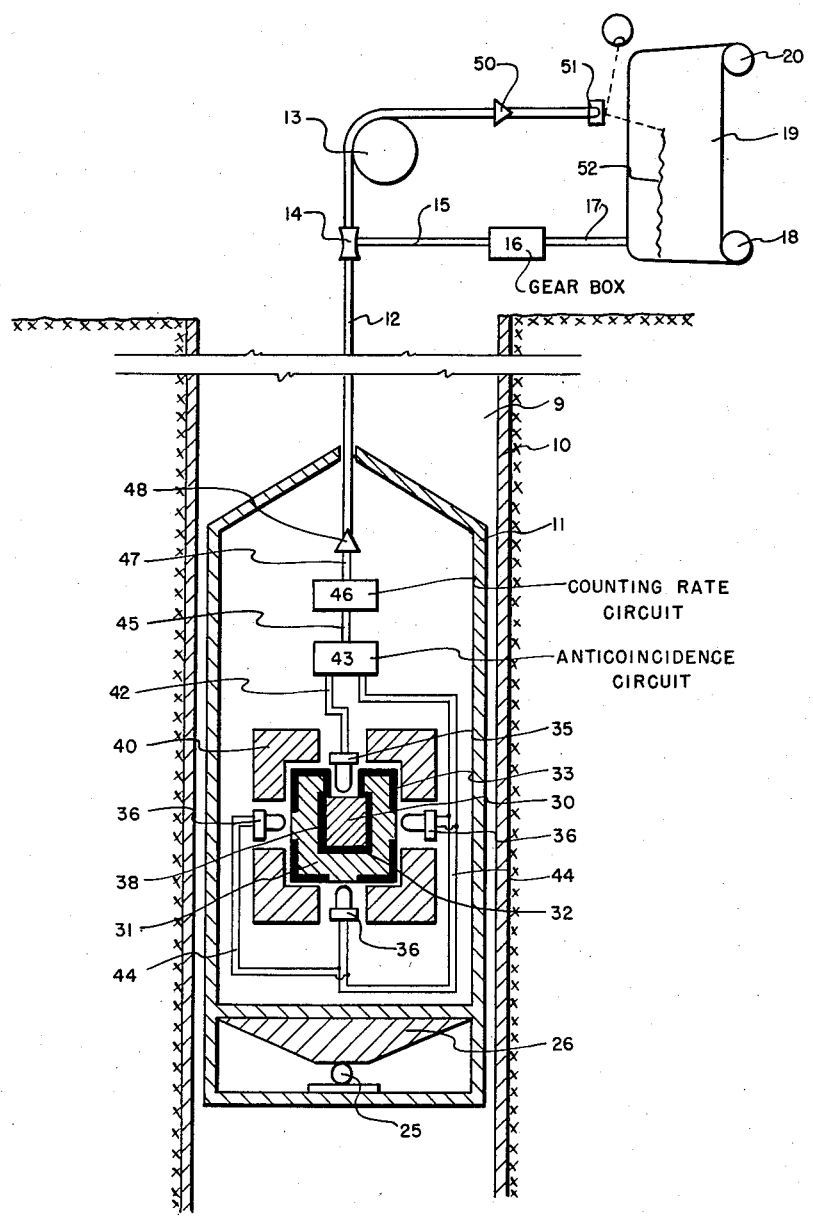

2,830,188

NEUTRON DETECTOR

Serge A. Scherbatskoy, Tulsa, Okla., assignor, by mesne assignments, to PGAC Development Co., Houston, Tex., a corporation of Texas Application January 11, 1954, Serial No. 403,260

2 Claims. (Cl. 250—71)

This invention is concerned with a radiation detector and apparatus for performing in a bore hole measurements of neutrons and involving the use of a neutron source for radiating neutrons into the formations adjoining the bore hole.

The neutrons emitted by said source possess a wide range of energy extending to 10 m. e. v. and they undergo numerous collisions during their passage through the formation. As a result of these collisions, the energy of the neutrons is gradually degraded and numerous gamma rays are produced in the formation. Thus a detector placed in the bore hole is exposed to heterogeneous radiations comprising a mixture of gamma rays and neutrons, said neutrons covering a wide range of energies extending from about 10 m. e. v. down to thermal values of 0.025 e. v. We shall differentiate hereafter neutrons having energies exceeding 100,000 e. v. which we shall designate as "fast neutrons" from neutrons comprised within the energy range from 100 e. v. to 100,000 e. v. The latter neutrons shall be designated as "intermediate neutrons."

It is an object of the present invention to detect and measure only intermediate neutrons and to eliminate at the detector all other radiations.

It is another object of the present invention to provide an improved method and improved apparatus for determining the character of unknown substances adjacent to a bore hole.

For further details of specific devices embodying the principles of this invention and for a more complete understanding of the mode of application of the principles of this invention and the numerous advantages thereof, reference may be made to the accompanying drawing which illustrates diagrammatically a bore hole which penetrates the strata of the earth and the general arrangement for logging the bore hole by measurements of medium fast neutrons.

Referring now to the drawing, there is schematically illustrated a drill hole 9 penetrating the formations to be explored. The bore hole is provided in the conventional manner by a tubular metallic casing designated as 10.

For the purpose of exploring the formations along the bore hole, there is provided in accordance with the present invention exploratory apparatus comprising a housing 11 which is lowered into the bore hole 9 by means of a cable 12, preferably including as a part thereof suitable insulated conductors. The cable 12 has a length somewhat in excess of the depth of the bore hole to be explored and is normally wound on a drum 13 positioned above the bore hole opening. The cable 12 may be unwound from the drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 mounted on a shaft 15, and rotation of the reel and consequently of the shaft 15 is transmitted through a gear box 16 to another shaft 17 which is drivingly connected to take up spool 18 for moving a photographic film 19 from a feed spool 20 to take up spool 18.

In the lower portion of the housing 11 there is provided a support on which is disposed a suitable source of neutrons generally designated as 25, such, for example, as a radium beryllium preparation, which may be enclosed in a container made of a suitable material such as glass.

The radiations transmitted from the source 25 tend to propagate themselves in all directions. I have provided, however, an absorbing block 26 formed of materials, for example, such as lead and paraffin, which is relatively opaque to penetrating radiations, the paraffin being relatively opaque to neutrons and the lead being relatively opaque to other radiations. I have, therefore, prevented a direct path between the source 25 and the detecting instrument positioned above the block 26. Consequently, the radiations emitted by the source 25 are directed sideways into the adjoining formations and the amount of radiation going upwards through the absorbing block is negligible.

The radiation detector located above the block 26 is of scintillation counter type and comprises crystals such as anthracene in combination with photomultipliers. The crystals are adapted to convert the incoming gamma rays or neutrons into impulses of light which subsequently impinge upon the corresponding photomultipliers provided with suitable voltage supplies. We obtain thus across the output terminals of such photomultipliers current impulses which coincide with the arrival of gamma rays. More particularly, the detector comprises anthracene crystal 30, said crystal being surrounded by a relatively larger anthracene crystal 31. The crystal 30 has its outside surface covered with an aluminum reflector 32, whereas the crystal 31 has its inside surface covered with aluminum reflector 32, and outside surface covered with aluminum reflector 33. The light flashes produced in the crystal 30 are adapted to be transmitted by means of the reflector 32 to a photomultiplier provided with a suitable voltage supply, the combined photomultiplier and voltage supply being designated as 35. Similarly, the light flashes produced in the crystal 31 are adapted to be transmitted by means of reflectors 32, 33 to one or more photomultipliers 36 (provided with voltage supplies), said photomultipliers 36 being connected in parallel. The crystals 30 and 31 are optically separated one from the other by the aluminum layer 32. Thus a light flash in the crystal 30 does not affect any of the photomultipliers 36 and a light flash in the crystal 31 does not affect the photomultiplier 35.

The detector is surrounded by a tungsten shield 40, the purpose of which is to shield the detector from soft gamma rays and X-rays. The output of the photomultiplier 35 is connected through leads 42 to one of the input channels of an anticoincidence circuit 43, the other input channel of said circuit being connected to the output of the photomultipliers 36 through leads 44. The anticoincidence circuit is adapted to produce a current pulse across its output leads 45 whenever a pulse is produced in the output of the photomultiplier 35, but there is no simultaneous pulse in the output of the photomultiplier 36. Anticoincidence circuits are well known in the art and for their description see, for instance, E. Segre, "Experimental Nuclear Physics," John Wiley & Sons, New York, N. Y., 1953, pp. 104–108.

The output leads 45 are applied to a counting rate circuit 46. Thus we obtain across the output leads 47 of the circuit 46 a D. C. voltage having magnitude representing the frequency of impulses produced by the anticoincidence circuit. The leads 47 are in turn applied through an amplifier 48 to the cable 12.

It is well known that anthracene crystals such as 30 and 31 respond not only to light particles such as electrons and gamma rays, but also to heavy particles such as protons and neutrons. However, the efficiency of the detector is smaller for heavy particles. Thus the light impulses and consequently the electrical impulses resulting from electrons and protons are substantially in the ratio 3:1, i. e. the impulse caused by an electron is about 3 times larger than the impulse caused by a proton of the same energy.

We shall consider now in particular the interaction of the incoming radiation with the crystal 30. It is well known that neutron and gamma rays do not interact directly with the crystal 30 and the interaction process is different for neutrons and gamma rays. Furthermore, the gamma rays interact with the crystal in three different ways: by photoelectric effect, Compton effect, and pair formation. We shall separately consider each of these interaction processes.

An incoming fast neutron strikes one of the atoms of the crystal 30 such as hydrogen, in which case the nucleus of hydrogen recoils as proton thus producing a pulse of light in the crystal 30, said light producing in turn a current impulse in the output of the photomultiplier 35. The incoming neutron is in turn scattered by the crystal 30 and the scattered neutron escapes from the crystal 30 and interacts with the crystal 31. If the incoming neutron is fast, i. e. if its energy is relatively large and exceeds 100,000 e. v., then the scattered neutron produces in the crystal 31 a relatively large light pulse which in turn causes a relatively large impulse to appear in at least one of the photomultipliers 36. If, however, the incoming neutron is moderate, i. e. if its energy is below 100,000 e. v., the scattered neutron interacting with the crystal 31 produces a small light pulse which is not detectable by the photomultiplier 36 since it is below its noise level. Consequently, in case of a fast neutron there is a simultaneous appearance of pulses in the photomultipliers 35 and 36. In case, however, of a moderate neutron we obtain a pulse in the photomultiplier 35 only. Since the anticoincidence circuit does not respond to simultaneous impulses, the detector is not responsive to fast neutrons, but is responsive to moderate neutrons.

Consider now the interaction of gamma rays with the crystal, and particularly the photoelectric interaction, Compton interaction and pair formation.

The number of photoelectric interactions in the crystal 30 is negligible since anthracene is comprised of atoms of low atomic number and because of the effect of the shield 40 which absorbed most of low energy gamma rays and X-rays.

In the Compton interaction the incoming photon is scattered by one of the electrons of the crystal 30. As a result of such scattering the electron has acquired kinetic energy, thus producing a pulse of light in the crystal 30, said light producing in turn a current impulse in the output of the photomultiplier 35. The scattered photon usually escapes from the crystal 30 and interacts with the crystal 31. As a result of such interaction, we obtain in the crystal 31 a flash of light which in turn produces a current pulse in at least one of the photomultipliers 36. Consequently, the Compton effect is characterized by a simultaneous occurrence of pulses in the photomultipliers 35 and 36. Since the anticoincidence circuit 43 does not respond to simultaneous impulses the detector is not responsive to gamma rays undergoing the Compton effect.

In the process of pair formation the incoming photon vanishes completely and a positron electron pair is created in the crystal 30. Both the electron and the positron slow down producing ionization and excitation of surrounding atoms, thus causing a flash of light in the crystal 30 and a corresponding current impulse in the output of the photomultiplier 35. After the positron has been reduced in energy, it makes a unique and final interaction with an orbital electron. In this interaction, the pair of positive and negative electrons unite and annihilate themselves in the formation of two photons that are ejected in opposite direction. These photons designated as annihilation quanta interact with the crystal 31 and produce an impulse in the output of at least one of the photomultipliers 36 which is coincident with the impulse in the output of the photomultiplier 35. Since the anticoincidence circuit 43 does not respond to simultaneous impuses the detector is not responsive to gamma rays undergoing the pair formation.

Since the occurrence of photoelectric effect is very infrequent, it can be assumed that Compton effect and pair formation are the only interactions that take place. Consequently, the detector does not respond to gamma radiation and does not respond to fast neutrons. However, an intermediate neutron interacts with the detector, we obtain a pulse across the leads 45, and, therefore, the output voltage of the counting rate circuit 46 represents the number of intermediate neutrons intercepted per second by the crystal 30. This voltage is transmitted through the amplifier 48, cable 12, amplifier 50, to the galvanometer coil 51 and produces in a manner well known in the art a trace 52 upon the photosensitive film, said trace representing the number of intermediate neutrons detected per second at various depths in the hole.

It will be obvious to those skilled in the art that numerous modifications other than those herein disclosed can be made without departing from the scope or spirit of the invention.

I claim:

1. In an apparatus for radiological bore-hole logging, a housing adapted to be lowered into a bore hole, said housing comprising a source of neutrons arranged to radiate neutrons into the formations surrounding said bore hole whereby gamma rays and neutrons are directed toward said bore hole as a result of interaction of said neutrons with said formations, a first radiation detector comprising an anthracene crystal carried in said housing, photomultiplier means for said first crystal, a second detector physically surrounding said first detector and comprising at least one additional anthracene crystal, said second detector comprising also additional photomultiplier means adapted for cooperation with said additional anthracene crystal, reflector means interposed between said first and second detectors operative to prevent light flashes from said first crystal from reaching said second photomultiplier means and light flashes from said additional crystal from reaching said first photomultiplier means, shielding means surrounding said detectors for attenuating soft gamma rays and X-rays impinging thereon, additional shielding means interposed between said neutron source and said detectors operative to attenuate neutrons and gamma rays and to prevent direct radiation from said neutron source from reaching said detectors, an anticoincidence circuit connected to both of said photomultipliers for providing an output signal on the occurrence of a light flash in said first anthracene crystal that is not simultaneous with an impulse in said additional crystal, and a counting-rate circuit connected to said anticoincidence circuit for providing a voltage representing the rate of occurrence of its output signals, the threshold of said photomultiplier means in said second detector being adjusted to provide an output pulse responsively to a flash produced in said additional crystal by a scattered neutron from said first detector having initial energy substantially in excess of 100,000 electron volts but not to provide output pulses responsively to flashes in said additional crystal produced by scattered neutrons from said first detector having initial energies below 100,000 electron volts, "initial energy" in both cases referring to the energy with which the neutron enters said first detector.

2. In an apparatus for radiological bore-hole logging, a housing adapted to be lowered into a bore hole, said housing comprising a source of neutrons arranged to radiate neutrons into the formations surrounding said bore hole whereby gamma rays and neutrons are directed toward said bore hole as a result of interaction of said neutrons with said formations, a first radiation detector comprising a scintillating element responsive to both gamma rays and neutrons, photomultiplier means for said scintillating element, a second radiation detector physically surrounding said first detector and comprising at least one additional scintillating element responsive to both gamma rays and neutrons, said second detector comprising also additional photomultiplier means adapted for cooperation with said additional scintillating element, reflector means interposed between said first and second detectors operative to prevent light flashes from said first scintillating element from reaching said second photomultiplier means and light flashes from said additional scintillating element from reaching said first photomultiplier means, shielding means surrounding said detectors for attenuating soft gamma rays and X-rays impinging thereon, additional shielding means interposed between said neutron source said said detectors operative to attenuate neutrons and gamma rays and to prevent direct radiation from said neutron source from reaching said detectors, an anti-coincidence circuit connected to both of said photomultipliers for providing an output signal on the occurrence of a light flash in said first scintillating element that is not simultaneous with an impulse in said additional scintillating element, and a counting-rate circuit connected to said anti-coincidence circuit for providing a voltage representative of the rate of occurrence of its output signals, the threshold of said photomultiplier means in said second detector being adjusted to provide an output pulse responsively to a flash produced in said additional scintillating element by a scattered neutron from said first detector having initial energy substantially in excess of 100,000 electron volts but not to provide output pulses responsively to flashes in said additional scintillating element produced by scattered neutrons from said first detector having initial energies below 100,000 electron volts, "initial energy" in both cases referring to the energy with which the neutron enters the first detector.

References Cited in the file of this patent

UNITED STATES PATENTS

| | | |
|---|---|---|
| 2,648,012 | Scherbatskoy | Aug. 4, 1953 |
| 2,659,011 | Youmans et al. | Nov. 10, 1953 |
| 2,740,989 | Youmans | Apr. 3, 1956 |

OTHER REFERENCES

Two-Crystal Gamma-Ray Scintillation Spectrometer, by R. E. Connally, from The Review of Scientific Instruments, vol. 24, No. 6, June 1953, pp. 458, 459.

An Anticoincidence Gamma-Ray Scintillation Spectrometer, by Richard D. Albert, from the Review of Scientific Instruments, vol. 24, No. 12, December 1953, pages 1096–1101.